(12) United States Patent
Pullen

(10) Patent No.: US 6,220,463 B1
(45) Date of Patent: Apr. 24, 2001

(54) SHELVING SYSTEM

(76) Inventor: Jerome A. Pullen, 2501- 22nd St. SE., Minot, ND (US) 58701

( * ) Notice: Subject to any disclaimer, the term of this patent is extended or adjusted under 35 U.S.C. 154(b) by 0 days.

(21) Appl. No.: 09/459,694

(22) Filed: Dec. 13, 1999

(51) Int. Cl.[7] .................................................. A47B 43/00
(52) U.S. Cl. ........................................................ 211/186
(58) Field of Search ................................ 211/186, 90.01, 211/90.04, 187

(56) References Cited

U.S. PATENT DOCUMENTS

| | | | |
|---|---|---|---|
| 834,411 | * | 10/1906 | Rotsheck . |
| 913,228 | * | 2/1909 | McCarthy . |
| 955,734 | * | 4/1910 | Wolkerstorfer . |
| 3,297,374 | * | 1/1967 | Radek . |
| 3,305,286 | * | 2/1967 | Fenwick . |
| 4,008,873 | * | 2/1977 | Travaglio et al. . |
| 4,889,377 | * | 12/1989 | Hughes ................................ 211/162 |
| 5,205,630 | * | 4/1993 | Welch et al. . |
| 5,472,103 | * | 12/1995 | Merl . |
| 6,109,461 | * | 8/2000 | Kluga et al. . |

* cited by examiner

*Primary Examiner*—Alvin Chin-Shue
*Assistant Examiner*—Sarah Purol

(57) ABSTRACT

A shelving system for allowing viewing of the contents of both the upper shelves and the lower shelves within a truck. The inventive device includes a plurality of vertical brackets that are vertically attached to the interior of the storage unit of a truck, a plurality of upward brackets are attached to the lower to middle portions of the vertical brackets, a plurality of downward brackets are attached to the upper portion of the vertical brackets, and a plurality of shelves attached to the brackets. The upper shelves are sloped downwardly to allow the user to view the contents of the upper shelves. The lower shelves are slanted upwardly thereby allowing the user to easily view and retrieve the contents thereof. The shelves preferably include a lip for preventing items from accidentally being removed. A plurality of drawers are preferably positioned within a housing below the lower shelves for increasing the utilization of space within the storage unit.

4 Claims, 3 Drawing Sheets

SHELVING SYSTEM

BACKGROUND OF THE INVENTION

1. Field of the Invention

The present invention relates generally to shelves for vehicles and more specifically it relates to a shelving system for allowing viewing of the contents of both the upper shelves and the lower shelves within a truck.

Individuals and salespeople often times utilize trucks with a plurality of shelves attached to the side walls of the interior of the truck. The shelves store a plurality to items for the individual and allow the individual to store and retrieve items during their business day. It is desirable to have shelves stacked along the entire portion of the interior wall of the truck. However, it is very difficult for the user to view the contents of the upper shelves because they can not see onto the upper portion of the upper shelves. Also, it is very difficult for the user to view the contents of the lower shelves because the shelves above the lower shelves block the user's view of the contents of the lower shelves. Hence, there is a need for a shelve system that allows viewing of both the upper and lower shelves.

2. Description of the Prior Art

Shelve systems have been in use for years. Typically, shelving systems for trucks are comprised of a plurality of shelves that are attached to the interior walls of the truck with the shelves parallel to one another and aligned upon a horizontal plane.

As stated previously, it is difficult to view the contents of the upper shelves and the lower shelves which makes it difficult to utilize all of the shelves. Because it is difficult for individuals to efficiently utilize the upper shelves and the lower shelves, they often times simply do not place items within them. In extreme situations, items placed within the upper shelves or lower shelves remain there for extended periods of time because the individual is unable to locate them.

Examples of attempted shelving systems for vehicles include U.S. Pat. No. 4,889,377 to Hughes; U.S. Pat. No. 5,884,957 to Shoen et al.; U.S. Pat. No. 4,029,222 to Yano et al.; U.S. Patent to which are all illustrative of such prior art.

Hughes (U.S. Pat. No. 4,889,377) discloses a vehicle storage system. Hughes teaches a plurality of storage compartments attached to a wall member wherein the all member is slidably from within the vehicle for allowing viewing of the contents of the shelves outside of the vehicle.

Shoen et al. (U.S. Pat. No. 5,884,957) discloses a moving vehicle equipped with vending machine. Shoen et al specifically teaches a vending device that is affixed to the interior of the moving vehicle and includes a sealing device affixed to the vending device for sealing the enclosed volume of the vending device.

While these devices may be suitable for the particular purpose to which they address, they are not as suitable for allowing viewing of the contents of both the upper shelves and the lower shelves within a truck. Conventional shelving systems for vehicles do not provide adequate viewing of the contents of the upper shelves and the lower shelves.

In these respects, the shelving system according to the present invention substantially departs from the conventional concepts and designs of the prior art, and in so doing provides an apparatus primarily developed for the purpose of allowing viewing of the contents of both the upper shelves and the lower shelves within a truck.

SUMMARY OF THE INVENTION

In view of the foregoing disadvantages inherent in the known types of shelving devices now present in the prior art, the present invention provides a new shelving system construction wherein the same can be utilized for allowing viewing of the contents of both the upper shelves and the lower shelves within a truck.

The general purpose of the present invention, which will be described subsequently in greater detail, is to provide a new shelving system that has many of the advantages of the shelving devices mentioned heretofore and many novel features that result in a new shelving system which is not anticipated, rendered obvious, suggested, or even implied by any of the prior art shelving devices, either alone or in any combination thereof.

To attain this, the present invention generally comprises a plurality of vertical brackets that are vertically attached to the interior of the storage unit of a truck, a plurality of upward brackets are attached to the lower to middle portions of the vertical brackets, a plurality of downward brackets are attached to the upper portion of the vertical brackets, and a plurality of shelves attached to the brackets. The upper shelves are sloped downwardly to allow the user to view the contents of the upper shelves. The lower shelves are slanted upwardly thereby allowing the user to easily view and retrieve the contents thereof. The shelves preferably include a lip for preventing items from accidentally being removed. A plurality of drawers are preferably positioned within a housing below the lower shelves for increasing the utilization of space within the storage unit.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a shelving system that will overcome the shortcomings of the prior art devices.

Another object is to provide a shelving system that allows viewing of the contents of both the upper shelves and the lower shelves within a truck.

An additional object is to provide a shelving system that increases the efficiency of a shelving system within a vehicle.

A further object is to provide a shelving system that allows the placement of labels and promotional literature upon the walls of the vehicle above each shelf.

Another object is to provide a shelving system that can be utilized within most vehicles with a storage unit attached thereto.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
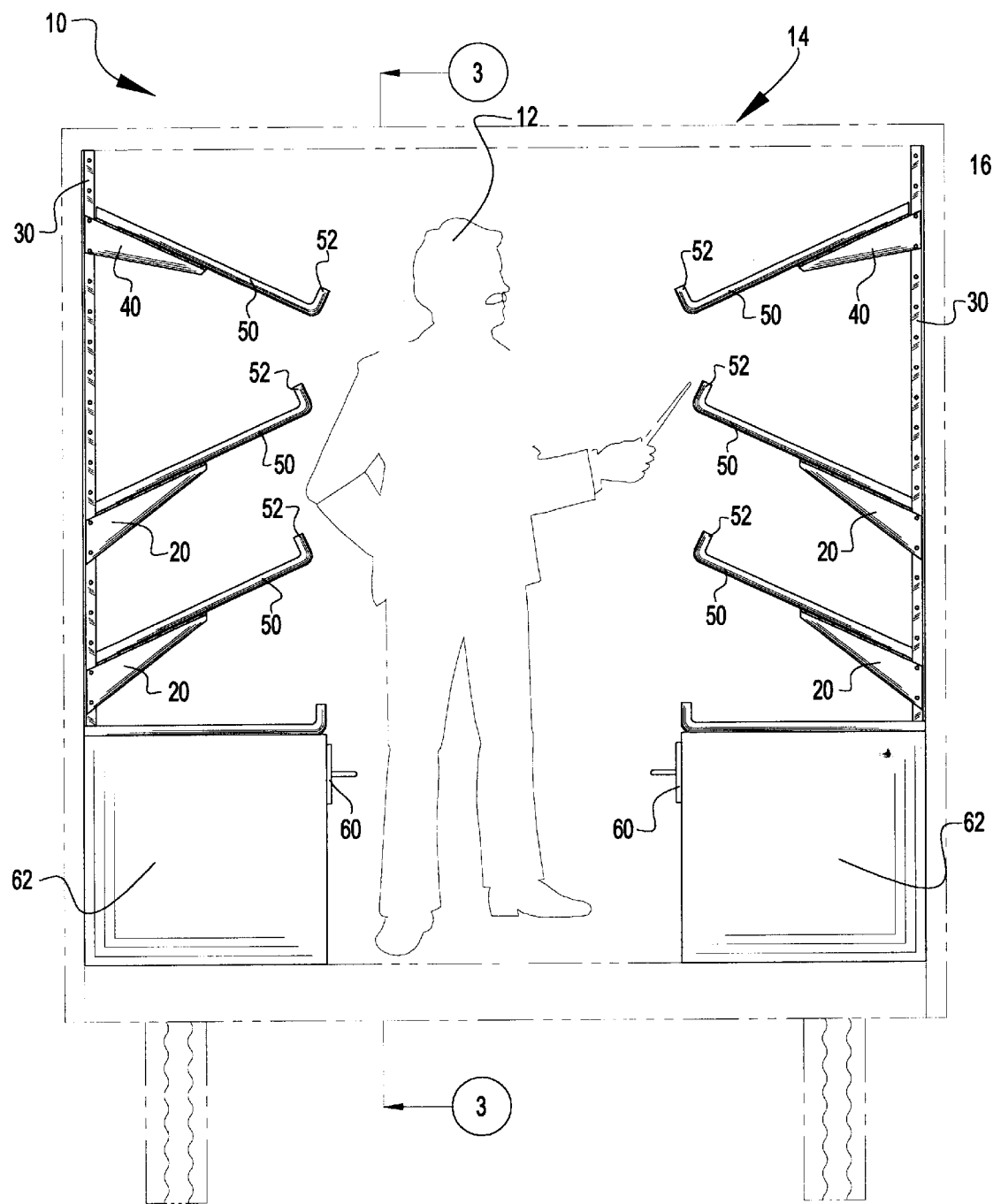
FIG. 1 is a rear view of the present invention.
Figure 2:
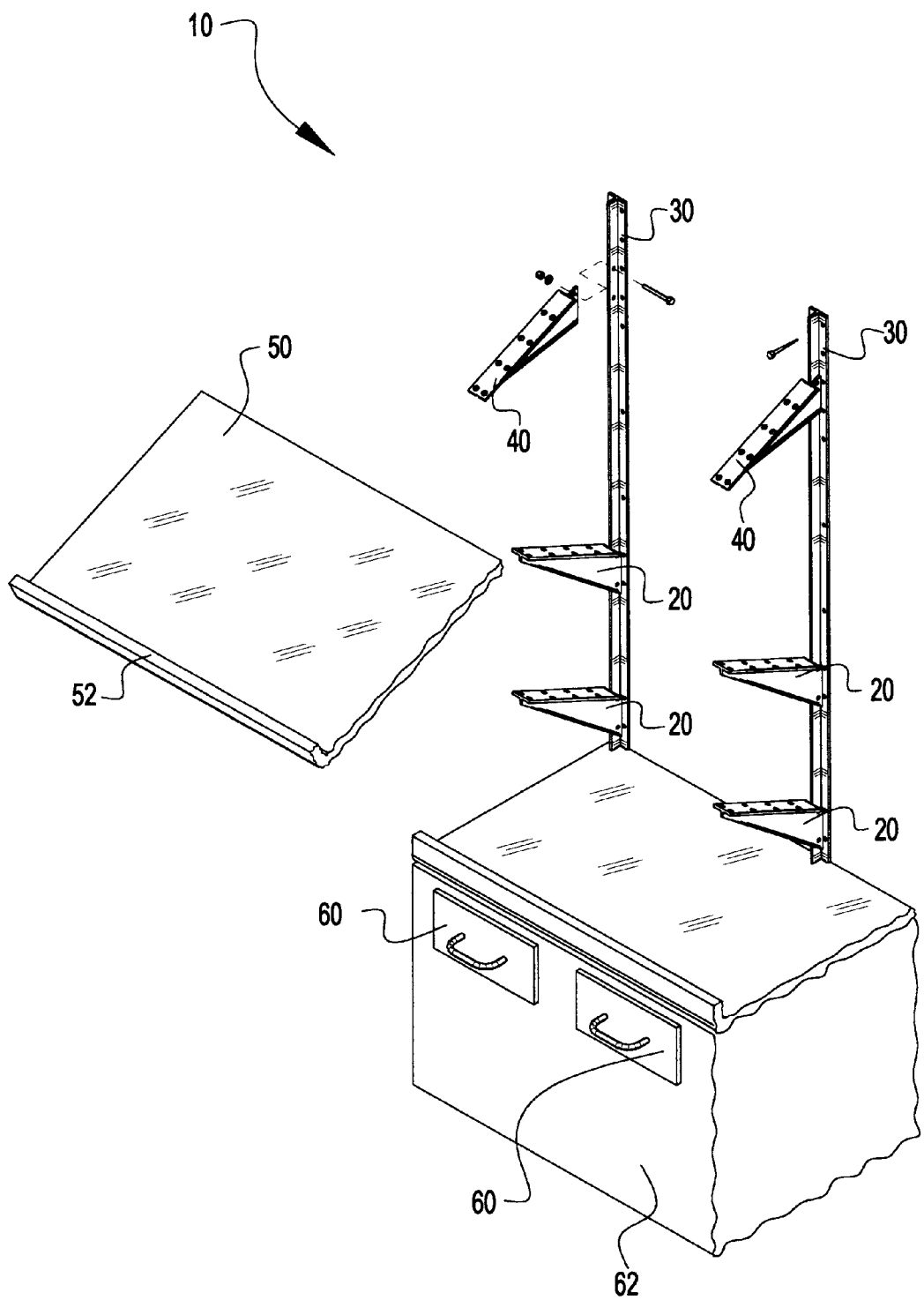
FIG. 2 is an exploded upper perspective view of the present invention.
Figure 3:
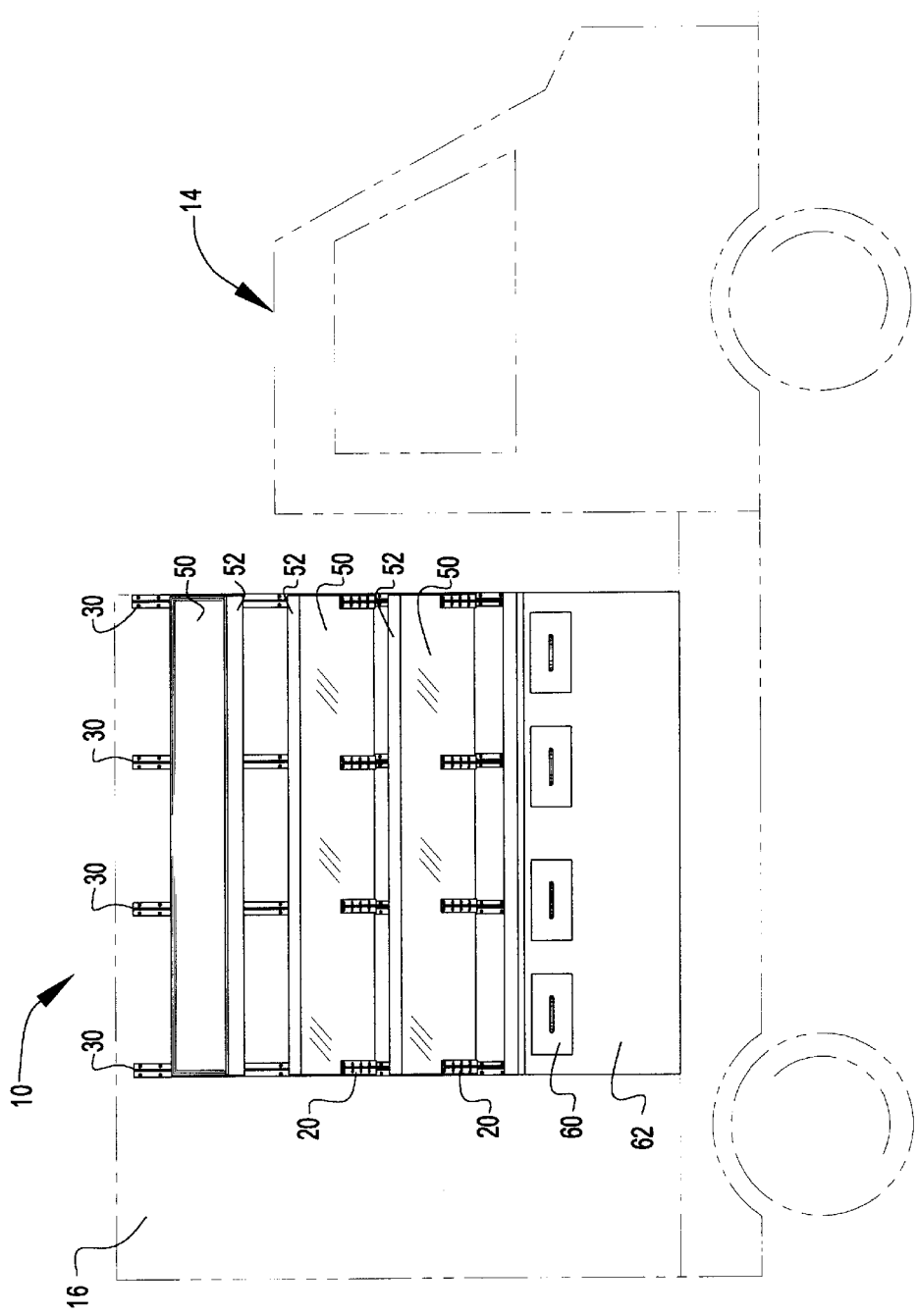
FIG. 3 is a cross sectional view taken along line 3—3 of FIG. 1.

Turning now descriptively to the drawings, in which similar reference characters denote similar elements throughout the several views, FIGS. 1 through 3 illustrate a shelving system 10, which comprises a plurality of vertical brackets 30 that are vertically attached to the interior of the storage unit 16 of a truck 14, a plurality of upward brackets 20 are attached to the lower to middle portions of the vertical brackets 30, a plurality of downward brackets 40 are attached to the upper portion of the vertical brackets 30, and a plurality of shelves 50 attached to the brackets. The upper shelves 50 are sloped downwardly to allow the user to view the contents of the upper shelves 50. The lower shelves 50 are slanted upwardly thereby allowing the user to easily view and retrieve the contents thereof. The shelves 50 preferably include a lip 52 for preventing items from accidentally being removed. A plurality of drawers 60 are preferably positioned within a housing 62 below the lower shelves 50 for increasing the utilization of space within the storage unit 16.

As shown in FIGS. 1 and 3 of the drawings, the truck 14 includes a storage unit 16 in the rear portion for storage. The storage unit 16 is typically a box-like structure, however various other shapes may be utilized to comprise the storage unit 16.

As shown in FIGS. 1 through 3 of the drawings, the vertical brackets 30 are each comprised of an elongated structure. The vertical brackets 30 preferably include a plurality of alignment apertures for receiving the brackets 20, 40. The vertical brackets 30 may be comprised of any well-known material.

As best shown in FIGS. 1 and 2 of the drawings, the lower brackets are comprised of upward brackets 20. The upward brackets 20 are angled upwardly as best shown in FIG. 1 of the drawings. The upward brackets 20 are attached to the lower and middle portions of the vertical brackets 30 with conventional fasteners.

It can be appreciated that various other fastening systems may be utilized to secure the brackets 20, 40 to the vertical brackets 30. The upward brackets 20 include a plurality of apertures for receiving fasteners inserted through the shelves 50 thereby securing the shelves 50 to the upward brackets 20.

As shown in FIGS. 1 and 2 of the drawings, the upper brackets are comprised of downward brackets 40 that are angled downwardly. The downward brackets 40 are attached to the upper portions of the vertical brackets 30 as best shown in FIG. 1 of the drawings. The downward brackets 40 include a plurality of apertures for receiving fasteners inserted through the shelves 50 thereby securing the shelves 50 to the upward brackets 20.

As shown in FIGS. 1 through 3 of the drawings, the shelves 50 are attached to the brackets 20, 40 at the respective angle of each of the brackets 20, 40. The shelves 50 attached to the downward brackets 40 are angled downwardly thereby allowing the user to view and retrieve items within the upper shelves 50. The shelves 50 attached to the upward brackets 20 are angled upwardly thereby allowing the user to view and retrieve items within the lower and middle shelves 50. As shown in FIG. 1 of the drawings the shelves 50 are preferably aligned to be angled toward the individual's head 12 thereby providing maximum viewing for the individual. It can be appreciated that the brackets 20, 40 may be various angles. Labels, identification, and marketing material may be attached to the interior wall of the storage unit 16 to reflect what items are stored upon the particular shelve 50.

As shown in FIGS. 1 through 3 of the drawings, at least one housing 62 is attached within the storage unit 16 below the lowest shelf 50. The housing 62 supports a plurality of drawers 60 that are slidably positioned within the housing 62 for storing various items.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Index of Elements for Shelving System

ENVIRONMENTAL ELEMENTS

10. Shelving System
11.
12. Head
13.
14. Truck
15.
16. Storage Unit
17.
18.
19.
20. Upward Brackets
21.
22.
23.
24.

-continued
Index of Elements for Shelving System
ENVIRONMENTAL ELEMENTS 25.
26.
27.
28.
29.
30. Vertical Brackets
31.
32.
33.
34.
35.
36.
37.
38.
39.
40. Downward Brackets
41.
42.
43.
44.
45.
46.
47.
48.
49.
50. Shelve
51.
52. Lip
53.
54.
55.
56.
57.
58.
59.
60. Drawers
61.
62. Housing
63.
64.
65.
66.

-continued
Index of Elements for Shelving System
ENVIRONMENTAL ELEMENTS 67.
68.
69.
70.
71.
72.
73.
74.
75.
76.
77.
78.
79.

I claim:

1. A shelving system for a vehicle, comprising:

a plurality of vertical brackets attachable to an interior of a storage unit upon a vehicle;

at least one set of upward brackets attachable to said vertical members;

at least one set of downward brackets attached to said vertical members; and a plurality of shelves attached to said upward brackets and said downward brackets.

2. The shelving system of claim 1, including at least one set of horizontal brackets attachable to said vertical members which receive at least one of said plurality of shelves.

3. The shelving system of claim 2, wherein said plurality of shelves include a lip portion.

4. The shelving system of claim 3, including:

at least one housing positionable below said shelves; and at least one drawer slidably positioned within said at least one housing.

\* \* \* \* \*